United States Patent
Tanaka et al.

(10) Patent No.: US 7,310,173 B2
(45) Date of Patent: Dec. 18, 2007

(54) HOLOGRAM RECORDING METHOD, HOLOGRAM RECORDING REPRODUCTION METHOD, HOLOGRAM RECORDING DEVICE, HOLOGRAM RECORDING/REPRODUCTION DEVICE AND HOLOGRAM REPRODUCTION DEVICE

(75) Inventors: Tomiji Tanaka, Saitama (JP); Mikio Sugiki, Kanagawa (JP); Shigeo Kobayashi, Chiba (JP); Koji Ishioka, Kanagawa (JP); Kazuo Takahashi, Tokyo (JP); Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 10/541,608

(22) PCT Filed: Dec. 26, 2003

(86) PCT No.: PCT/JP03/17061

§ 371 (c)(1),
(2), (4) Date: Jul. 7, 2005

(87) PCT Pub. No.: WO2004/064050

PCT Pub. Date: Jul. 29, 2004

(65) Prior Publication Data

US 2006/0072421 A1    Apr. 6, 2006

(30) Foreign Application Priority Data

Jan. 14, 2003    (JP) .............................. 2003-006406

(51) Int. Cl.
*G02B 5/32* (2006.01)
(52) U.S. Cl. .......................................... 359/21; 359/22
(58) Field of Classification Search .................... 359/1, 359/21, 22, 24, 25, 32, 35
See application file for complete search history.

(56) References Cited

U.S. PATENT DOCUMENTS

| 5,311,360 A | 5/1994 | Bloom et al. |
| 5,777,760 A * | 7/1998 | Hays et al. ..................... 359/7 |

FOREIGN PATENT DOCUMENTS

| JP | 54-40045 | 3/1979 |
| JP | 10-124872 | 5/1998 |
| JP | 2000-163802 | 6/2000 |
| WO | 97/43669 | 11/1997 |

* cited by examiner

*Primary Examiner*—Alessandro Amari
(74) *Attorney, Agent, or Firm*—Oblon, Spivak, McClelland, Maier & Neustadt, P.C.

(57) ABSTRACT

In the hologram recording and hologram-record reproduction using a one-dimensional optical modulator, the one-dimensional optical modulator where a plurality of light-modulating pixels are arranged modulates a laser beam to record a digital-data signal on a hologram recording medium, and part of the light-modulating pixels record sync signals in two or more positions on the hologram recording medium with retaining a predetermined interval, thereby improving hindrance to reproduction or readout of information recorded on the hologram recording medium, a decrease in S/N, and so on due to deformation or the like of the hologram recording medium.

3 Claims, 9 Drawing Sheets

HOLOGRAM RECORDING METHOD, HOLOGRAM RECORDING REPRODUCTION METHOD, HOLOGRAM RECORDING DEVICE, HOLOGRAM RECORDING/REPRODUCTION DEVICE AND HOLOGRAM REPRODUCTION DEVICE

TECHNICAL FIELD

The present invention relates to a hologram recording method, a hologram-record reproducing method, a hologram recording apparatus, a hologram recording and reproducing apparatus, and a hologram reproducing apparatus.

BACKGROUND ART

The basic structure for hologram recording is as follows; a laser beam from a laser beam source is split into two beams, one of the split laser beams is modulated by an optical modulator in accordance with recording information to be signal light, the other of the split laser beams is made to be reference light, both the light beams are superimposed on a hologram recording medium, and interference fringes due to a change in the refractive index caused by the interference of both the laser beams are formed on the hologram recording medium, whereby information is recorded.

Reproduction of information from the hologram recording is performed as follows; the signal light is cut, only the reference light is applied to the hologram recording medium with the same position and angle of incidence as those when recording hologram, the interference fringes are formed on the recording medium, whereby reproduced light based on diffracted light corresponding to the original signal light can be obtained, and accordingly the reproduced light is detected by a sensor such as CCD (Charge Coupled Device) (refer to, for example, Holographic Data Storage by H. J. Coufal, D. Psaltis, G. T. Sincerbox p. 350, Springer Series Verlag, July 2000, Optical Science, and Optical Data Storage 2001, Proceedings of SPIE Vol. 4342 (2002) p. 567).

The hologram recording as described above is performed as follows; using a one-dimensional optical modulator in which a plurality of, for example, 1088 light-modulating pixels are arranged in one dimension, that is, for example, using GLV (Grating Light Valve) (refer to Grating Valve Technology: Update and Novel applications, for example), signal light is obtained based on a light and dark (white and black) image optically modulated from a laser beam according to information of "1", "0" from each light-modulating pixel, and the signal light is applied to the hologram recording medium together with the reference light to perform hologram recording. In this case, when reproducing the record, reproduced light from the hologram recording medium is detected by a one-dimensional photodetector having a plurality of light-detecting portions where light-detecting elements of appropriate size are arranged at appropriate positions corresponding to the light-modulating pixels in an optical modulator.

However, in this case, when the position and angle of the hologram recording medium at the time of recording is shifted at the time of reproduction, the position of the reproduced image also shifts and so there may be some cases where the intended reproduction becomes difficult.

Figure 11:
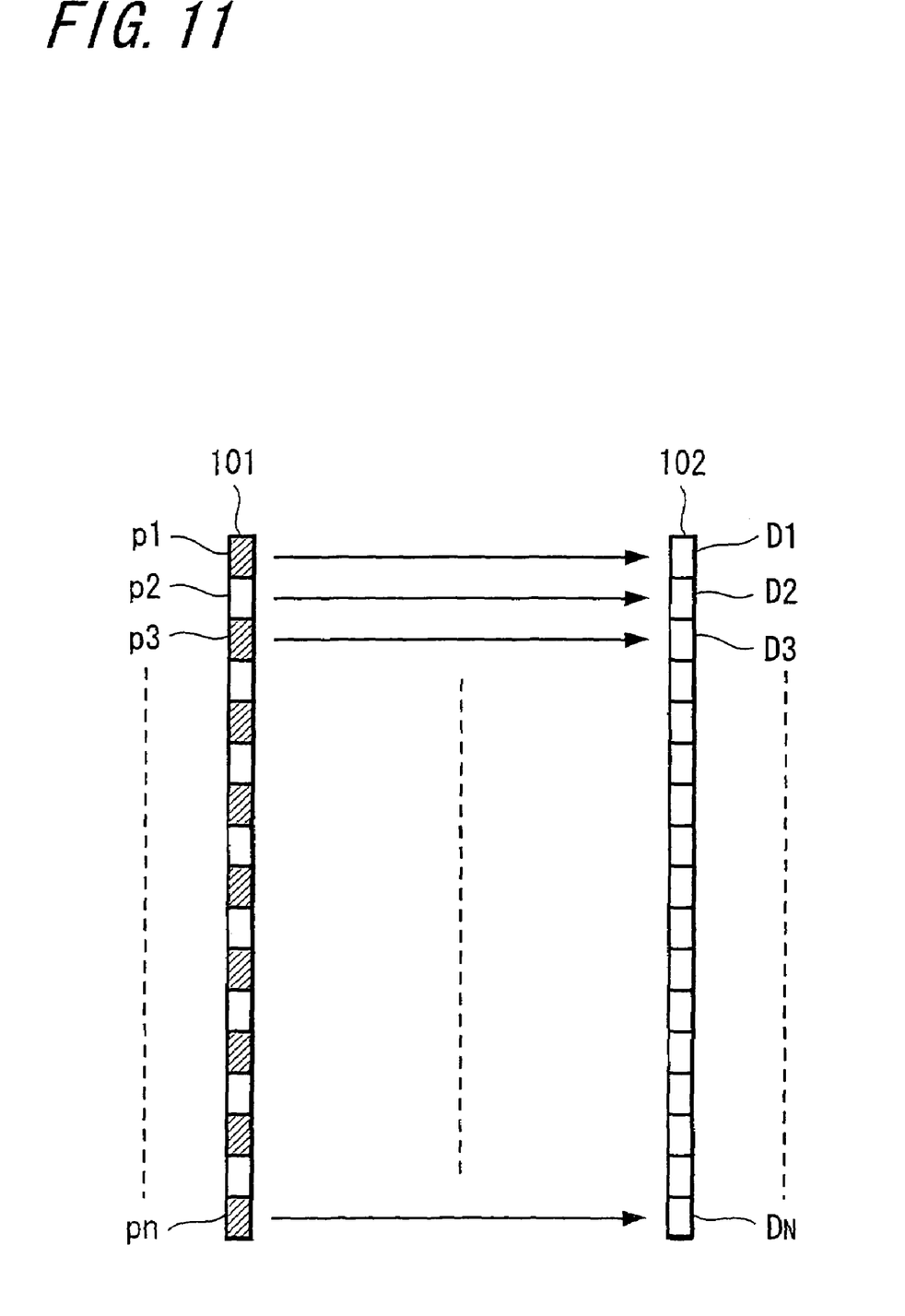
FIG. 11 is a diagram showing a relation between a one-dimensional optical modulator and a one-dimensional photodetector in a conventional hologram recording and reproducing apparatus.

FIG. 11 schematically shows a relation of arrangement between the one-dimensional optical modulator 101 having a plurality of light-modulating pixels P1, P2, P3 . . . Pn and the one-dimensional photodetector 102, in which the number n of detecting elements D1, D2, D3, . . . Dn in the one-dimensional photodetector 102 is selected to be the same, for example, 1088 as that of the light-modulating pixels in the one-dimensional optical modulator 101.

However, according to the above structure, when signals "1", "0" modulated by an optical modulator 1 are digital data supplied as ON/OFF of light for example, in the case where the one-dimensional optical modulator 101 performs modulation in such a manner that, for example, signal "1" is given to alternate pixels and signal "0" is given to the other alternate pixels among the light-modulating pixels P1, P2, P3 . . . Pn, if the shift occurs between the light-modulating pixels P (P1, P2, P3, . . . Pn) in the one-dimensional modulator 101 and the detecting elements D (D1, D2, D3 . . . Dn) in the one-dimensional photodetector 102 by, for example, one-half, "1" and "0" enter detecting elements half by half, as a result, no light and dark (white and black) image can be obtained but, for example, a uniformly gray one is obtained, which means that detection of information is impossible.

The occurrence of such shift is quite common. Specifically, because the hologram recording medium often takes the form of a disc or card and the recording and reproduction is repeated frequently, when the hologram recording medium is installed in the hologram recording apparatus or reproducing apparatus, a shift in position and a shift in angle are very likely to occur.

Moreover, the hologram recording medium is often made of organic materials and thus often requires ultraviolet-ray irradiation and heat treatment during recording or after recording; on this occasion, several % of shrinkage is often caused. Therefore, not only the above-described simple shift occurs in the reproduced position, but also one-to-one correspondence between the light-modulating pixels P in the one-dimensional optical modulator 101 and the detecting elements D in the one-dimensional photodetector 102 will collapse. Such phenomena also make the reproduction difficult or decrease the S/N.

DISCLOSURE OF THE INVENTION

The present invention is to provide a hologram recording method, hologram-record reproducing method, hologram recording apparatus, hologram recording and reproducing apparatus, hologram-record reproducing apparatus capable of efficiently avoiding the above-described obstacle to hologram-record reproduction, a decrease of S/N and so on.

Specifically, a hologram recording method according to the present invention includes the steps of: modulating a laser beam by a one-dimensional optical modulator in which a plurality of light-modulating pixels are arranged and recording a digital-data signal on a hologram recording medium, and recording sync signals on the hologram recording medium in two or more positions with retaining a predetermined interval by means of part of light-modulating pixels in the one-dimensional optical modulator.

A hologram reproducing method according to the present invention includes the steps of: applying reference light to the hologram recording medium having a digital-data recording section and sync-signal recording sections formed in two or more positions with a predetermined interval, reading the digital data and the sync signals, and detecting the shift in the position of the digital-data signal by the sync signals.

Further, a hologram recording apparatus according to the present invention includes: a laser-beam source, split means for splitting a laser beam from the laser-beam source into a first laser beam and second laser beam, a one-dimensional optical modulator in which a plurality of light-modulating pixels are arranged, and a hologram-recording-medium disposing portion; in which part of the light-modulating pixels in the one-dimensional optical modulator optically modulates part of the first laser beam by a digital-data signal, at least part of the other light-modulating pixels in two or more positions optically modulates at least part of the other of the first laser beam by a sync signal to obtain signal light of the laser beam, and the signal light and reference light of the second laser beam are applied to the hologram recording medium to form a recording section for the digital-data signal and recording sections for the sync signals in two or more positions with retaining a predetermined interval.

A recording and reproducing apparatus according to the present invention includes a laser-beam source, split means for splitting a laser beam from the laser-beam source into a first laser beam and second laser beam, a one-dimensional optical modulator in which a plurality of light-modulating pixels are arranged, a hologram-recording-medium disposing portion, and a photodetector at least in one-dimension having a larger number of light-detecting elements than that of light-modulating pixels in the one-dimensional optical modulator; in which at the time of recording, part of the light-modulating pixels optically modulates part of the first laser beam by a digital-data signal and at least part of the other light-modulating pixels in two or more positions in the one-dimensional optical modulator optically modulates at least part of the other of the first laser beam by sync signals to obtain signal light of the laser beam; the signal light and reference light of the second laser beam are applied to the hologram recording medium to form a recording section for the digital-data signal and recording sections for the sync signals in two or more positions with retaining a predetermined interval; and at the time of reproduction, the reference light of the second laser beam is applied to the hologram recording medium to supply reproduced light obtained from the hologram recording medium to the light-detecting elements in the photodetector for detecting the digital-data signal and sync signals to detect a shift in a position of the digital-data signal by the sync signals.

Further, in the above-described recording apparatus and further, for example, in the above-described recording and reproducing apparatus according to the present invention, the one-dimensional optical modulator has an array of a plurality of reflecting ribbons, and each reflecting ribbon may have a diffraction-grating structure in which a phase of an arrived laser beam is modulated and reflected corresponding to the displacement thereof and diffracted light is generated.

Further, a hologram reproducing apparatus according to the present invention includes a laser-beam source, a photodetector in which a plurality of light-detecting elements are arranged, and a disposal portion for disposing a hologram recording medium having a recording section for a digital-data signal and recording sections for sync signals in two or more positions, in which the hologram recording medium disposed in the disposal portion is irradiated with reference light of a laser beam from the laser-beam source to obtain reproduced light including the digital-data signal and sync signals recorded on the hologram recording medium, and the reproduced light is detected by the photodetector to detect a shift in a position of the digital-data signal by the sync signals.

As described above, in the present invention not only a digital-data signal, namely, original recording information signal but also sync signals are recorded on a hologram recording medium, and in reproduction, the original information signal as well as the sync signals are detected so as to detect a shift in a position of the original information signal.

Since the detection of a position can be made in this way, it is possible to correct a shift of a position and a shift of an angle in a hologram recording apparatus, hologram reproducing apparatus or the like due to repeated use of the hologram recording medium, and further to correct a shift in a position of a recording signal caused by shrinkage and so on of the hologram recording medium.

BEST MODE FOR CARRYING OUT THE INVENTION

Embodiments of the present invention will be described.
First, an embodiment of a hologram recording apparatus according to the present invention will be described with reference to the schematic constitutional diagram of a recording and reproducing apparatus in FIG. 1. However, the present invention is not limited to this embodiment.

[Hologram Recording Apparatus]

Figure 1:
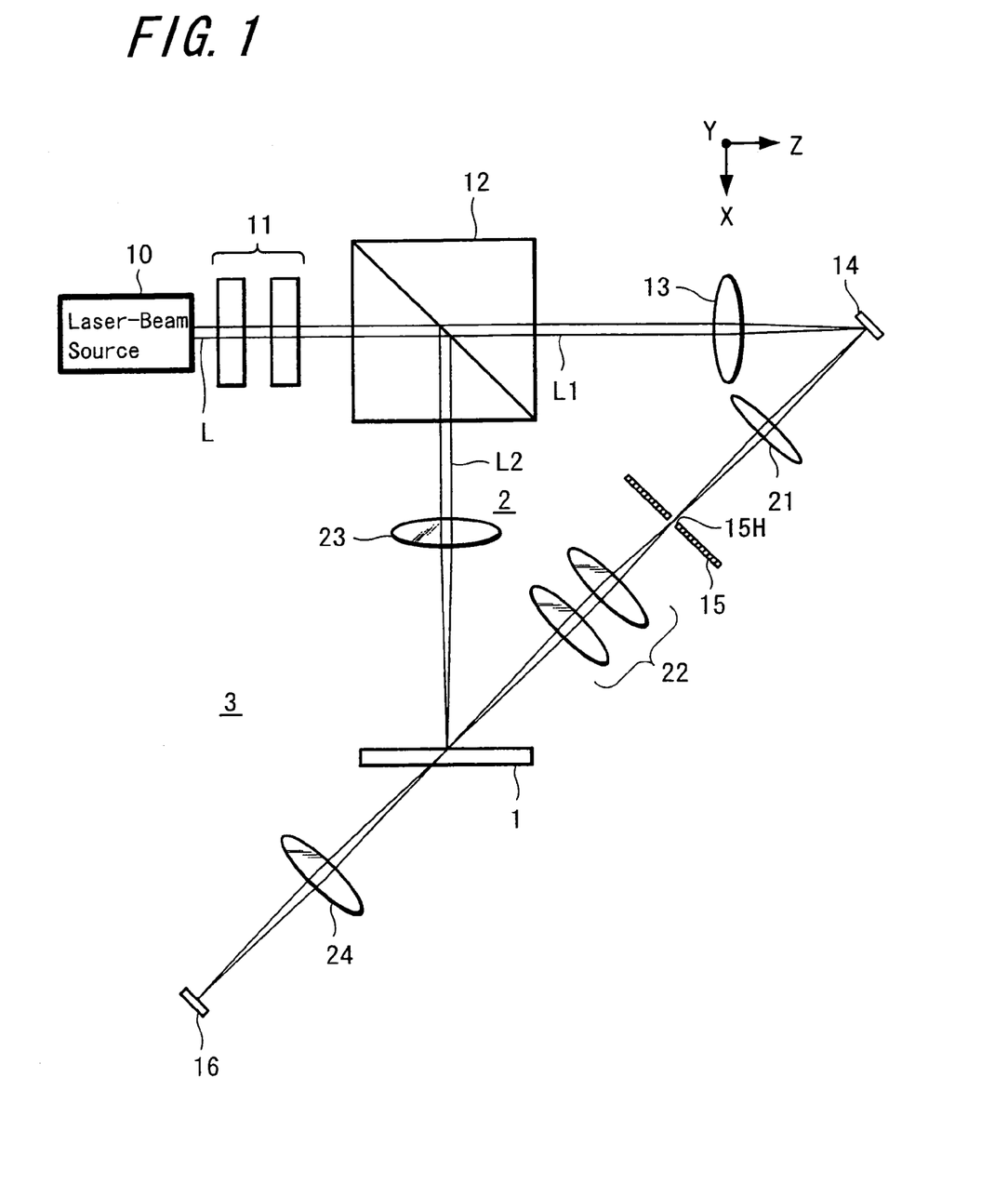
FIG. 1 is a schematic constitutional diagram of an example of a hologram recording and reproducing apparatus according to the present invention.

In the embodiment shown in FIG. 1, a light-transmissive type hologram recording medium is employed as a hologram recording medium 1.

Recording on the hologram recording medium 1 is performed as follows; a diameter of a laser beam L from a laser-beam source 10 is expanded by a beam expander 11 in a Y-direction perpendicular to the paper plane and is introduced into a half-mirror 12 which splits the laser beam into a first laser beam L1 and second laser beam L2 having the optical paths in a Z-direction and in a X-direction, respectively, which are perpendicular to the Y-direction and to each other.

The first laser beam L1 is condensed in the Z-direction by a cylindrical lens 13 and introduced into a one-dimensional optical modulator 14.

The first laser beam L1 is hereupon optically modulated into a signal light, which is condensed by a first lens 21 and passes through a pinhole 15H.

A second lens system 22 condenses the laser beam L1, that is, a signal light onto a hologram recording medium 1.

On the other hand, the second laser beam L2 split by the half-mirror 12 in the X-direction is condensed as reference light by a third lens system 23 onto the hologram recording medium 1. In this way, a hologram recording is performed on the hologram recording medium 1 by an interference between the first laser beam (signal light) and the second laser beam (reference light).

Next, an embodiment of a hologram recording and reproducing apparatus will be described with reference to FIG. 1.

[Hologram Recording and Reproducing Apparatus]

This embodiment includes a hologram-recording-apparatus section 2 and a hologram-reproducing apparatus section 3.

In the hologram-recording-apparatus section 2, recording is made onto the hologram recording medium 1 by the same structure and operation as described above.

The hologram-reproducing apparatus section 3 includes a fourth lens system 24 and a one-dimensional photodetector 16.

This hologram-reproducing apparatus section 3 can be formed, for example, using part of the structure of the hologram-recording-apparatus section 2 in common. However, in this case, the first laser beam L1 will be cut in reproducing operation.

The hologram-reproducing apparatus section 3 in this case includes the laser-beam source 10, beam expander 11, half-mirror 12 and the third lens system 23 in optical system relating to the second laser beam L2 as reference light, and further the fourth lens system 24 and the one-dimensional photodetector 16 disposed behind the hologram recording medium 1.

By applying the reference light to the hologram recording medium 1 in the same condition of incidence as in recording, reproduced light Ls can be extracted from the hologram recording medium 1 as if it were transmitted light of the signal light L1.

The fourth lens system 24 described above is disposed at a diffusing position on an optical path of the reproduced light Ls, so that the reproduced light Ls is condensed onto the one-dimensional photodetector 16. In this case, an optical image by the reproduced light Ls in the one-dimensional photodetector 16 is obtained as a light and dark image corresponding to the light and dark image obtained in the one-dimensional optical modulator 14.

In the above-described hologram recording apparatus and hologram recording and reproducing apparatus, it is desirable for the one-dimensional optical modulator 14 to employ a one-dimensional GLV (Grating Light Valve) array having, for example, an electrostatic driving type structure made of a reflective type diffraction control grating with high modulating efficiency and quick response.

Figure 2:
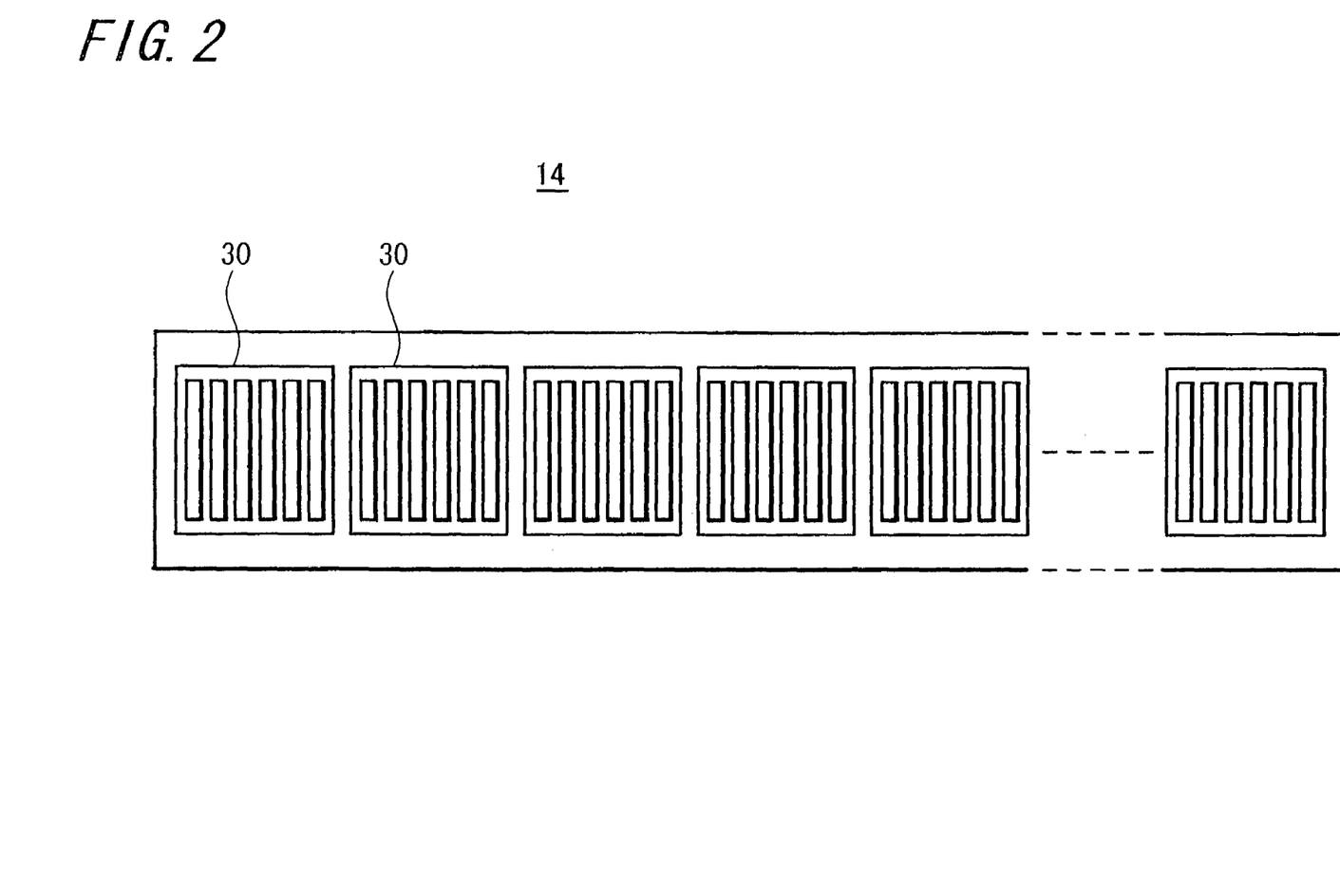
FIG. 2 is a schematic plan view of an example of a one-dimensional optical modulator in the apparatus according to the present invention.

As is shown in FIG. 2, the GLV includes a large number, for example, 1088 pieces of pixels 30 arranged in a line, each of which has a diffraction grating structure and forms one light-modulating pixel.

Figure 3:
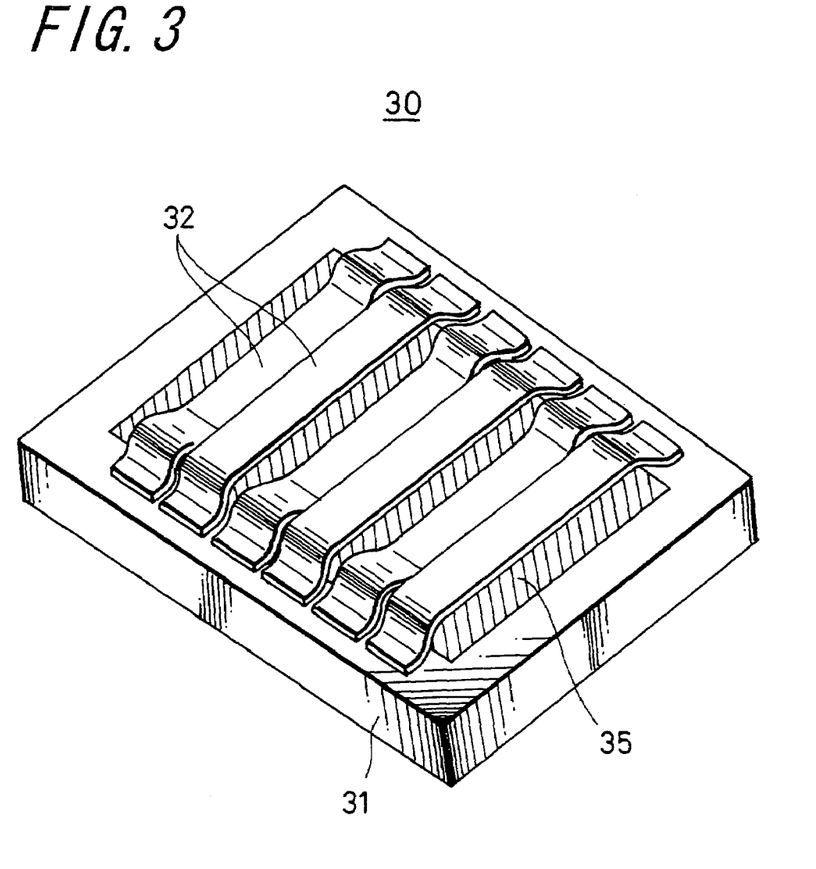
FIG. 3 is a perspective view of one pixel in an example of a one-dimensional optical modulator in the apparatus according to the present invention.
Figure 4:
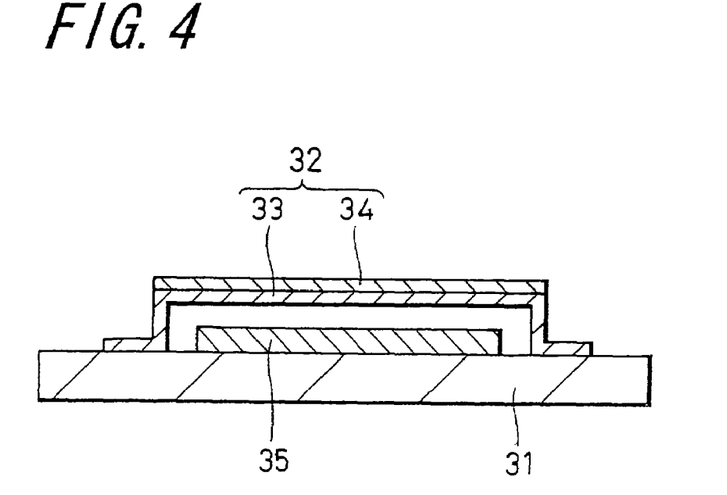
FIG. 4 is a sectional view of one pixel in an example of a one-dimensional optical modulator according to the present invention.

As is shown in a perspective view of FIG. 3 and in a sectional view of FIG. 4, each pixel 30 has, for example, six ribbons 32 on a substrate 31 made of silicon substrate, for example; each ribbon 32 is supported at both ends, reflects the laser beam L1 and is arranged in parallel to form a diffraction grating.

Figure 5A:
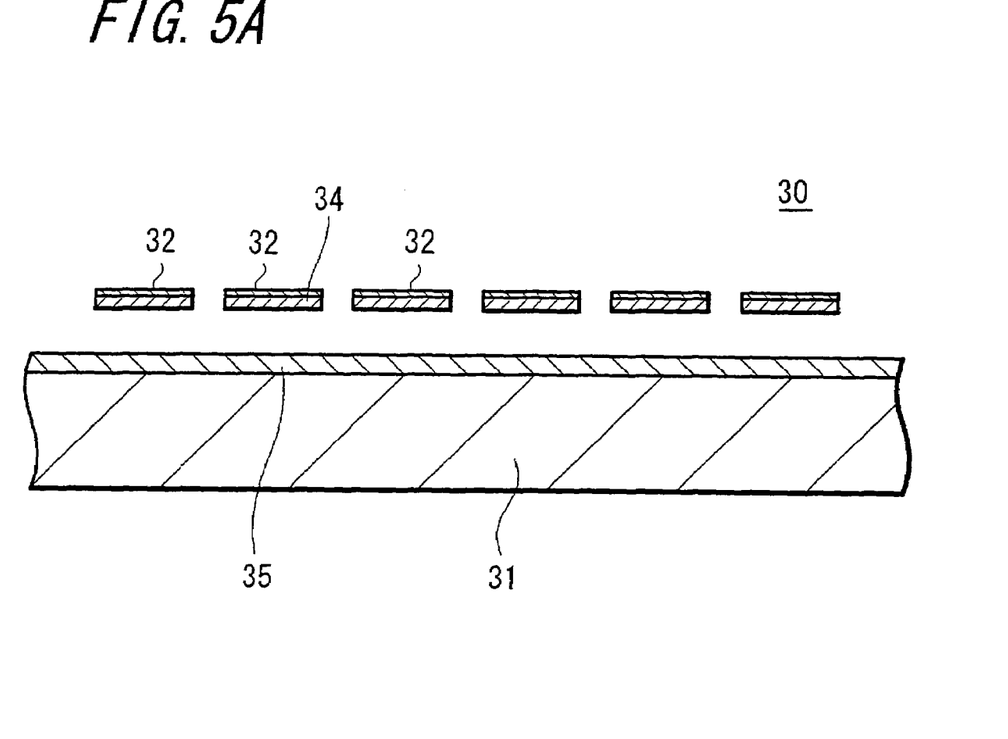
FIG. 5A and FIG. 5B are sectional views each showing an operating state of an example of a one-dimensional optical modulator.

As is shown in a cross-sectional view of FIG. 5A, these ribbons 32 are arranged on one plane, where the center portion of each ribbon retains a required distance from the surface of the substrate 31 by support portions at both ends.

As is shown in FIG. 4, the ribbon 32 includes an electrode layer 34 made of a metal film constituting a reflective surface, which is formed on an insulation film 33 made of, for example, silicon nitride.

On the other hand, a common opposing electrode 35 is formed on the substrate 31, which extends across under the arranged ribbons 32 and is opposite to the electrode layer 34 of each of ribbons 32 so as to retain a required gap with the ribbons 32.

Figure 5B:
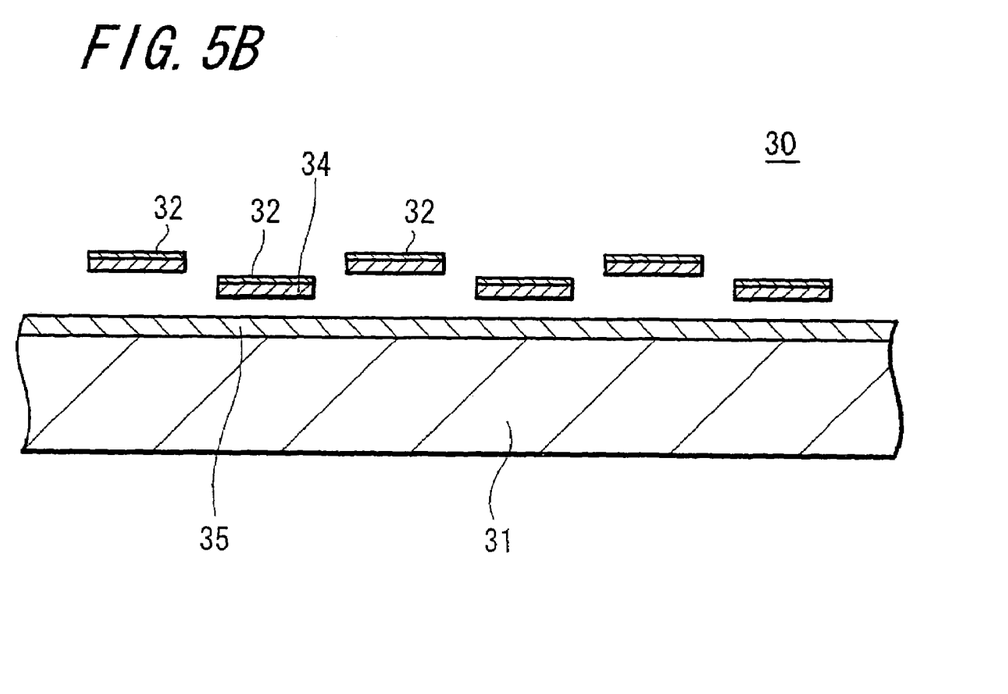

In this structure, by applying a required voltage between the electrode layers 34 of alternate ribbons 32 and the opposing electrode 35, these alternate ribbons 32 are displaced toward the opposing electrode 35, as shown in FIG. 5B, by an amount equivalent to $\lambda/4$ where $\lambda$ is a wavelength of the laser beam L1 applied to the GLV.

By doing in this way, when the above laser beam L1 is applied to the pixels 30 in a line, each constituting a light-modulating pixel, in the state in which the six ribbons 32 corresponding to one light-modulating pixel are situated on the same one plane as shown in FIG. 5A, the pixel 30 as the light-modulating pixel does not operate as a diffraction grating; and the laser beam L1 arrived at the light-modulating pixel is merely reflected, and with respect to this light-modulating pixel, for example, information of "1" as signal light of "light" is recorded on the hologram recording medium 1.

In contrast, when a displacement of $\lambda/4$ is caused by applying a required voltage for a signal of, for example, "0" between the electrode layer 34 of alternate ribbons 32 and the opposing electrode 35 to modulate a phase of laser beam arrived here and to make the laser beam reflect, laser beams reflected at adjacent ribbons 32 interfere with each other to cause substantially no reflected light, whereby the laser beam is substantially lost with respect to this pixel, that is, light-modulating pixel and is modulated into a signal of "dark" of "0"; on this occasion, for example, information of "0" is recorded on the hologram recording medium 1.

When the one-dimensional optical modulator 14 having the diffraction grating structure is employed in this manner, higher order light than ± first order light and ± second order light of diffracted light will be generated, however, such light is cut off by the above-described shield 15.

The ribbon 32 of each pixel, that is, light-modulating pixel 30 can be selected to be, for example, 3 μm in width, 100 μm in length, and 100 nm in thickness; and the distance between the ribbons 32 and the opposing electrode 35 is selected to be, for example, 650 nm. A pitch of pixels 30 can be made to be 25 μm.

The one-dimensional photodetector has an array in which a plurality of light-detecting elements are arranged. The one-dimensional photodetector can be formed of, for example, CCD (Charge Coupled Device) whose light-receiving portion is arranged in one dimension. The number of these light-detecting elements or the arrays is selected to be larger than the number of pixels in the one-dimensional optical modulator 1.

Figure 6:
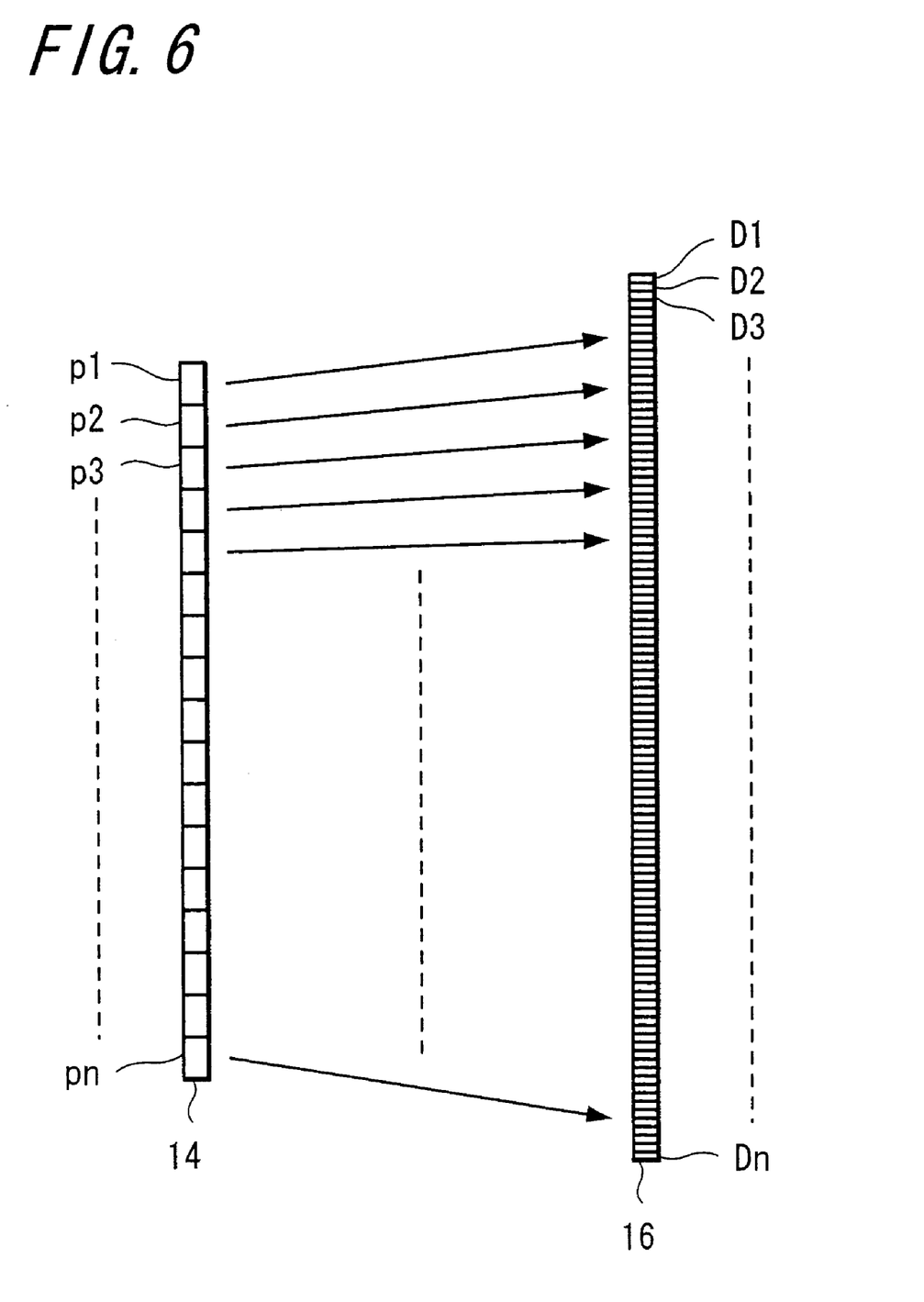
FIG. 6 is a diagram showing a relation between pixels in a one-dimensional optical modulator and detecting elements in a one-dimensional photodetector in an example of the apparatus according to the present invention.

In other words, as shown in FIG. 6, when n pieces of light-modulating pixels P, that is, P1, P2, P3 . . . Pn are arranged in the one-dimensional optical modulator 14, the number N of the light-detecting elements in the one-dimensional photodetector 16, namely the light-receiving portions D1, D2, D3, . . . DN, for example, in the case of CCD is made to be n<N.

Further, the one-dimensional optical modulator can also be formed of part of a two-dimensional optical modulator, for example.

The optical systems, for example, the first to fourth optical systems 21 to 24 can be selected so that an optical image on the one-dimensional photodetector 16 may correspond to the optical image in the one-dimensional optical modulator 14.

[Hologram Reproducing Apparatus]

Figure 7:
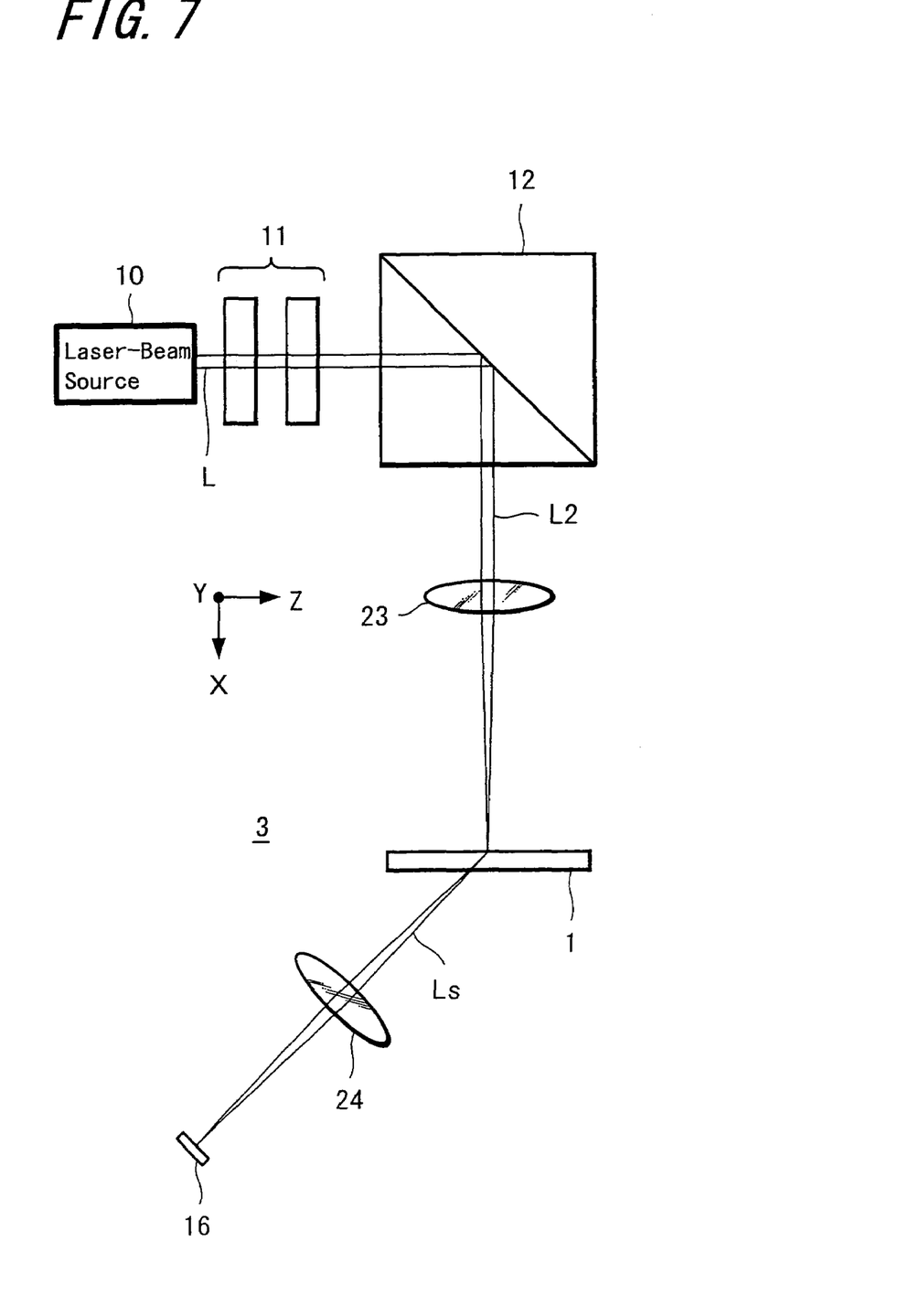
FIG. 7 is a schematic constitutional diagram of an example of the hologram reproducing apparatus according to the present invention.

FIG. 7 shows an embodiment of a hologram reproducing apparatus according to the present invention. This hologram reproducing apparatus has the same structure as that of the hologram-reproducing apparatus section 3 in the hologram recording and reproducing apparatus described in FIG. 1. In FIG. 7, the parts corresponding to those in FIG. 1 are denoted by the same symbols and not described repeatedly.

Next, an embodiment of the recording method according to the present invention will be described.

[Hologram Recording Method]

In this embodiment the hologram recording is performed using the hologram recording and reproducing apparatus according to the present invention shown in FIG. 1.

In this hologram recording method, of all pixels P in the one-dimensional optical modulator 14 having a plurality of light-modulating pixels P, light-modulating pixels in two or more positions retaining a predetermined interval are employed as light-modulating pixels for sync signals and the laser beam L1 is optically modulated by the sync signals. The other major part of pixels P is used to optically modulate the laser beam L1 arrived at the one-dimensional optical modulator 14 based on the digital-data signal of original recording information.

The modulation using the sync signals is performed in such a pattern that is not used in the modulation method based on the digital-data signal. For example, when the 8-10 modulation method is performed, "1" or "0" continues from 1T to 4T, but does not continue on and after 5T. Thus, when this modulation method is performed, for example, "1" in 6T is defined as a sync signal.

Next, an embodiment of the hologram reproducing method will be described.

[Hologram Reproducing Method]

In this embodiment, for example, using the hologram recording and reproducing apparatus shown in FIG. 1, the first laser beam L1 is cut and only the second laser beam L2 as reference light is applied to the hologram recording medium 1, or using the hologram reproducing apparatus shown in FIG. 7, the second laser beam L2 is applied to the hologram recording medium retaining the same position and angle of incidence and so on as those in recording. When doing so, the reproduced light Ls corresponding to the signal light L1 is obtained. In other words, a light and dark image corresponding to the light and dark image obtained by the one-dimensional optical modulator 14 can be obtained on the one-dimensional photodetector 16. Therefore, the digital-data signal and sync signals can be detected by the one-dimensional photodetector.

Further, since these sync signals are disposed in two positions retaining a predetermined interval, these sync signals are used as position-detecting signals to correct a shift in a position of the digital data, and therefore the digital data obtained from the one-dimensional photodetector 16 can be detected correctly.

Next, a practice example of the recording and reproduction according to the present invention will be described.

PRACTICE EXAMPLE

In this example, the recording and reproduction was performed using the hologram recording and reproducing apparatus whose schematic constitution is shown in FIG. 1 in accordance with the above-described procedure. In this case, the 8-10 modulation method was employed as the modulation method for a digital-data signal. In this method, as described above, the pattern of "1" and "0" signal continues until 4T, but does not continues on and after 5T. Accordingly, the pattern of sync signal was defined as "1" in 6T.

The sync signal pattern was disposed at both ends of an array of light-modulating pixels in the one-dimensional optical modulator 14, that is, a pair of sync signals was disposed.

Further, as described above, this practice example employed the optical system for making the image in the one-dimensional optical modulator 14 at the time of recording correspond one to one with the image of received light in the one-dimensional photodetector 16 at the time of reproduction.

The one-dimensional optical modulator 14 employed the above-described GLV and the one-dimensional photodetector 16 employed the CCD array.

The GLV had a structure in which 1088 modulating pixels P were arranged with a 25 μm pitch, and the one-dimensional photodetector 16 had a structure in which light-detecting elements, that is, light-receiving portions D were arranged with a 7 μm pitch. Therefore, in this case, the number of portions D became 25/7=3.6 per pixel P. Although the result is not integral number, sync signals are disposed with a predetermined interval in the method according to the present invention and the position of a digital-data-signal section is detected by a relative position of the sync signals, so that no problem occurs.

Figure 8:
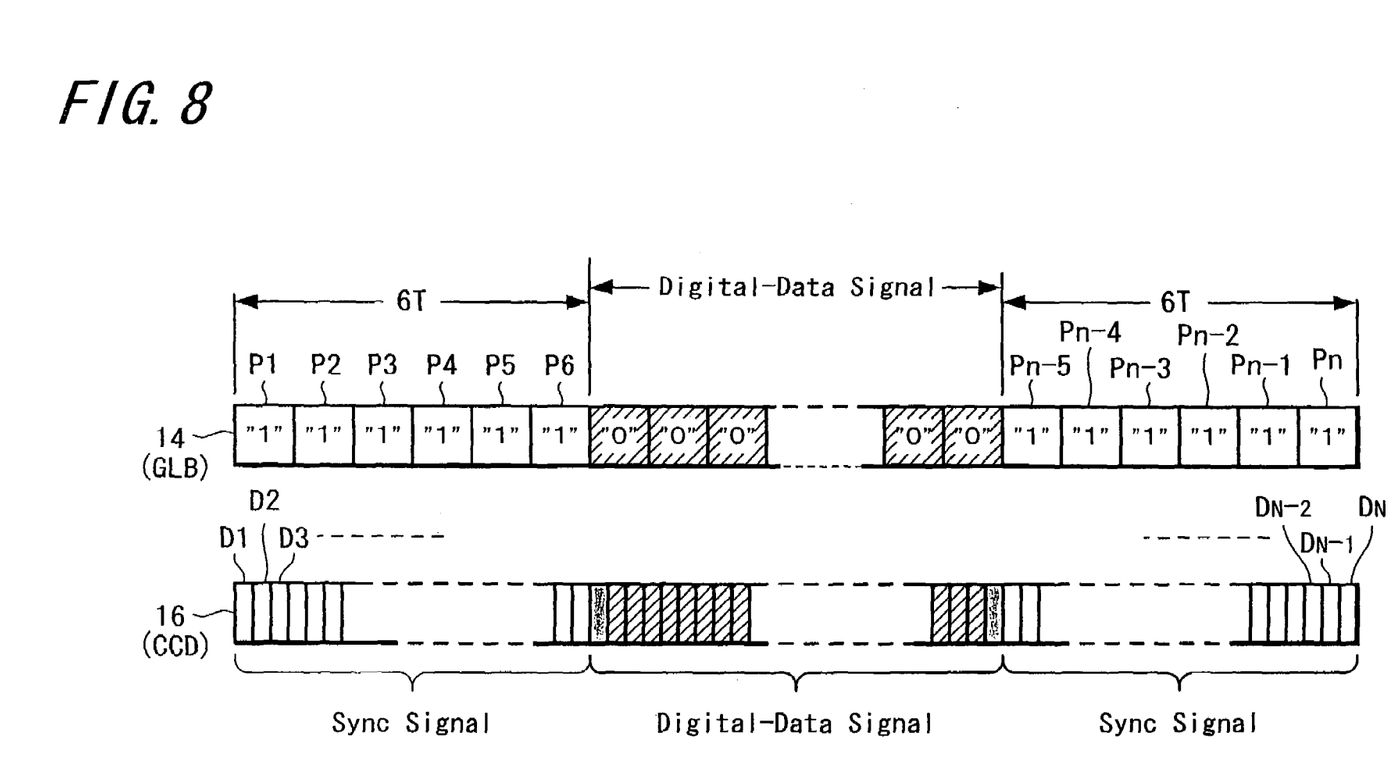
FIG. 8 is an explanatory view showing a corresponding relation between modulation by a one-dimensional optical modulator and light-receiving intensity of a one-dimensional photodetector in an example of the hologram recording and reproducing method according to the present invention.

FIG. 8 schematically shows the image in the one-dimensional optical modulator 14 at the time of recording and the image of received light in the one-dimensional photodetector 16 at the time of reproduction in this practice example.

This was the case where the above-described "1" in 6T as sync signal was disposed at both ends. Specifically, the sync signal was disposed in the first to sixth pixels P1 to P6 from one end and in pixels Pn to Pn-5 at the other end, respectively.

In this way, information recorded on the hologram recording medium is reproduced. In other words, by detecting the pair of sync signals, an interval between them can be known. Based on this information, a correction signal can be obtained, which corrects a shift in an information signal, that is, digital-data signal if a shift in position or a shift in angle occurs, or shrinkage and so on is caused in the hologram recording medium itself, when the hologram recording medium 1 is disposed at the hologram-disposed portion of hologram recording and reproducing apparatus in recording and reproduction, as described at the beginning.

Figure 9:
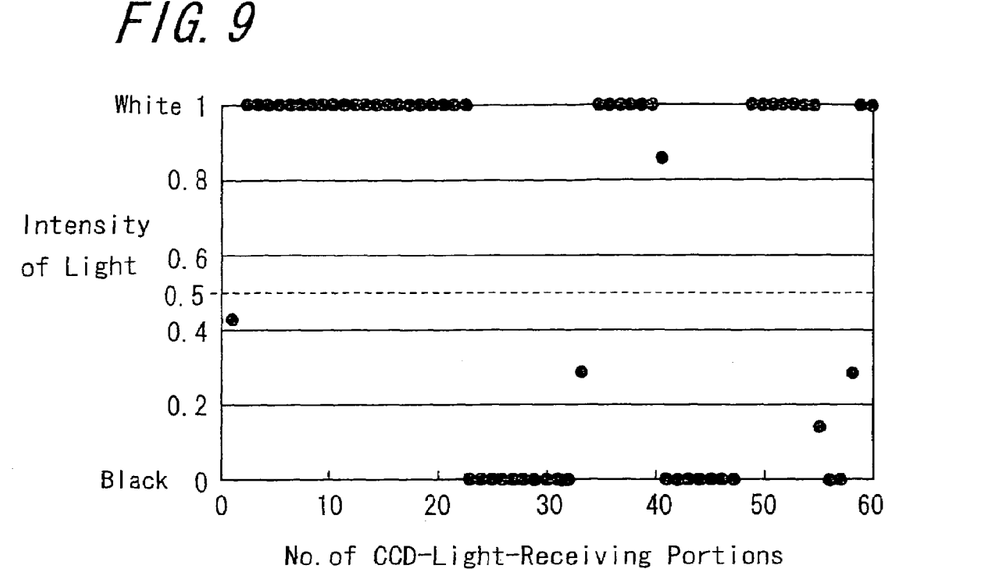
FIG. 9 is a diagram showing light-receiving intensity of light-detecting elements (pixels) in CCD as a one-dimensional photodetector.

It should be noted that at the time of hologram reproduction, in the light-receiving portion (light-detecting element) D of the CCD at a position corresponding to, for example, a boundary between "1" of "light" and "0" of "dark", a gray portion where the light is mixed with the dark will be generated. FIG. 9 shows the intensity of light in the vertical axis, which is received by an array of sixty CCD light-receiving portions (horizontal axis), for example, at No.0 to No.60 in the CCD array; and in this case, an intermediate "gray" intensity between "1" and "0" may be detected at a position corresponding to the boundary between "1" of "white" and "0" of "black".

Figure 10:
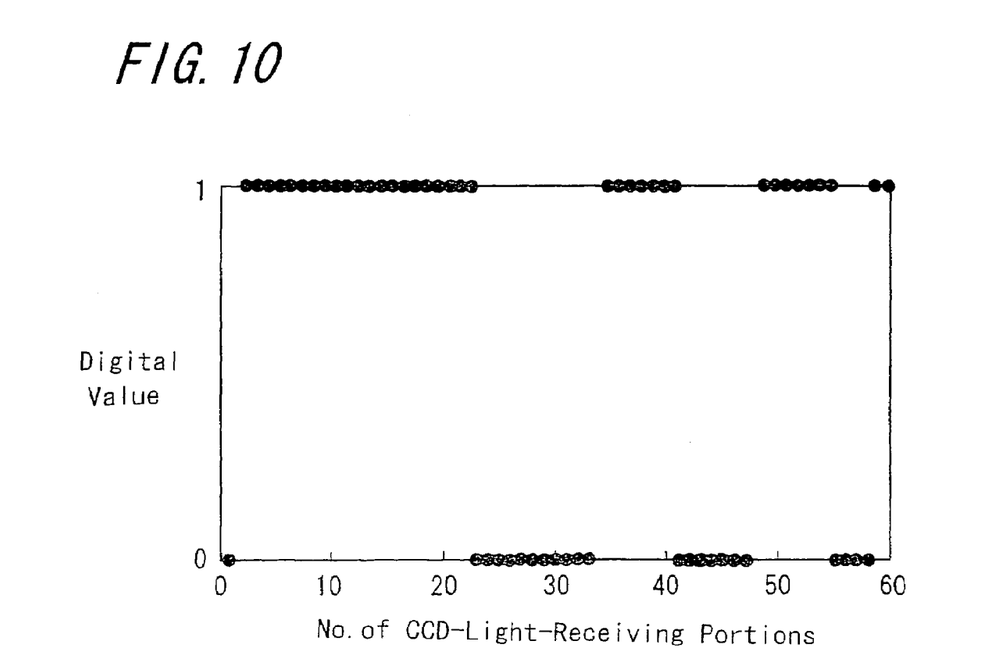
FIG. 10 is a diagram showing a relation between light-receiving intensity of light-detecting elements (pixels) in CCD as the one-dimensional photodetector in FIG. 9 and digitized values "1" and "0" thereof.

However, because the CCD can usually detect $2^8$ tones, the intensity of light at the boundary position can be detected correctly, and by performing signal processing based on this output, as shown in FIG. 10, it is possible to make them into binary values of digital "1" and "0" with an intermediate light intensity 0.5 between "1" and "0" as a dividing position.

Therefore, in the above-described practice example, it is also possible to divide the detected gray portions at a detecting element D in the one-dimensional photodetector 16, corresponding to the boundary between pixels P6 and P7 and so on into binary values.

Note that although the 8-10 modulation method has been described as an example in the above-described embodiment, the present invention is applicable to other various modulation methods, and in those other modulation methods, the sync signals are also made in a pattern unused in this modulation method. These sync signals may be disposed at both ends of the one-dimensional optical modulator 14 as in the above-described embodiment or may not be disposed at both ends, provided that they are disposed at positions retaining a predetermined interval.

Having described the case where the GLV having an excellent response to a laser beam and a high modulating efficiency is employed as the one-dimensional optical modulator 14 in the above-described embodiment, the DMD (Digital Micromirror Device), liquid crystal, and so on can also be employed; and thus, the present invention is not limited to the above-described embodiment, practice example, and so on and various modifications and alterations can be made therein.

As described above, according to the present invention, sync signals are recorded on a hologram recording medium together with a digital-data signal, that is, an original recording information signal, and in reproduction, the original information signal as well as the sync signals are detected, thereby enabling a position of the information signal, that is, digital-data signal to be detected by the sync signals.

Since the position detection is performed in this way, it is possible to correct the shift in a position and the shift in an angle in the hologram recording apparatus, hologram reproducing apparatus or the like due to repeated use of the hologram recording medium, and further to correct the shift in a position of recorded signal due to shrinkage and so on of the hologram recording medium.

Moreover, because the digital data can be detected securely even though the hologram recording medium is made of organic materials, or even if the shrinkage occurs when applying ultraviolet-rays during recording or after recording, or in heat treatment, it is possible to avoid difficulty in the reproduction and a decrease in S/N due to collapse of the corresponding relationship between the light-modulating pixels P in the one-dimensional optical modulator 1 and the corresponding detecting elements D in detector.

The invention claimed is:

1. A hologram recording apparatus comprising:
  a laser beam source,
  split means for splitting a laser beam from the laser beam source into a first laser beam and a second laser beam,
  a one-dimensional optical modulator in which a plurality of light-modulating pixels are arranged, and
  a hologram-recording-medium disposing portion,
  wherein part of the light-modulating pixels in said one-dimensional optical modulator optically modulate part of said first laser beam by a digital-data signal, and at least part of the other light-modulating pixels in two or more positions in said one-dimensional optical modulator optically modulate at least part of the other of said first laser beam by sync signals to obtain signal light by the laser beam,
  the signal light and reference light by said second laser beam are applied to a hologram recording medium to form on the hologram recording medium a recording section for said digital-data signal and recording sections for said sync signals in two or more positions having a predetermined interval.

2. A hologram recording apparatus according to claim 1, wherein said one-dimensional optical modulator is formed of an array of a plurality of reflecting ribbons, and
  each reflecting ribbon has a diffraction grating structure in which a phase of the arriving laser beam is modulated by the displacement of the ribbon to be reflected and diffracted light is generated.

3. A hologram recording and reproducing apparatus comprising:
  a laser beam source,
  split means for splitting a laser beam from the laser beam source into a first laser beam and a second laser beam,
  a one-dimensional optical modulator in which a plurality of light-modulating pixels are arranged,
  a hologram-recording-medium disposing portion, and
  a photodetector at least in one dimension, having a larger number of light-detecting elements than that of the light-modulating pixels in said one-dimensional optical modulator,
  wherein at the time of recording, part of light-modulating pixels in said one-dimensional optical modulator optically modulate part of said first laser beam by a digital-data signal and at least part of the other light-modulating pixels in two or more positions in said one-dimensional optical modulator optically modulate at least part of the other of said first laser beam by sync signals to obtain signal light;

the signal light and reference light by said second laser beam are applied to the hologram recording medium to form on the hologram recording medium a recording section for said digital-data signal and recording sections for said sync signals in two or more positions retaining a predetermined interval; and at the time of reproduction, the reference light by said second laser beam is applied to said hologram recording medium, said light-detecting elements in said photodetector receive reproduced light obtained from the hologram recording medium, and said digital-data signal and said sync signals are detected to detect a shift in a position of said digital-data signal by the sync signals.

* * * * *